March 12, 1968  T. E. SIMECEK ET AL  3,372,625
EXTERNAL GUSSETING PROCESS
Filed May 24, 1965
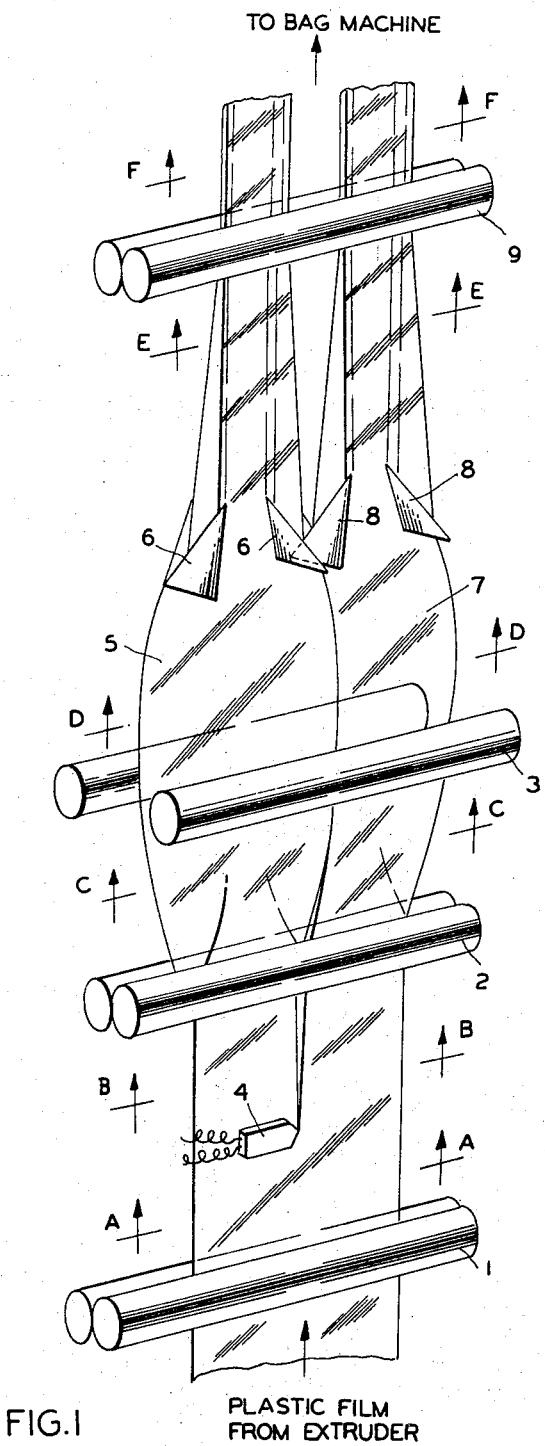
FIG.1 PLASTIC FILM FROM EXTRUDER
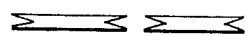
FIG.7
FIG.6
FIG.5
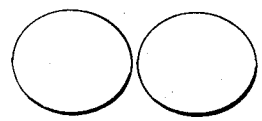
FIG.4
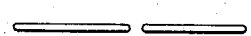
FIG.3
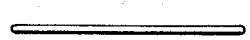
FIG.2
INVENTORS
THOMAS E. SIMECEK
RONALD G. SIMECEK
BY Jerome Purdy
ATTORNEY

United States Patent Office 3,372,625
Patented Mar. 12, 1968

3,372,625
EXTERNAL GUSSETING PROCESS
Thomas E. Simecek and Ronald G. Simecek, Cleveland, Ohio, assignors to The Dow Chemical Company, Midland, Mich., a corporation of Delaware
Filed May 24, 1965, Ser. No. 458,214
3 Claims. (Cl. 93—35)

ABSTRACT OF THE DISCLOSURE

A method and apparatus for continuously producing one or two gusset folds in each of one or more flattened, continuous, tubular films wherein the film is internally inflated as it passes through a zone between two pinching seals and subjected to a gusset fold producing means while in that inflated zone.

---

This invention relates to the preparation of gusseted plastic bags and, more particularly, it relates to the preparation of such bags from tubular plastic material.

Transparent plastic bags are well known today for packaging any of a wide variety of small products so that the purchaser can see the product before he buys it. Unlike paper and certain other packaging materials, transparent plastic films can be prepared in a tubular for, which, in turn, can be made into a bag without the necessity of a longitudinal seam in the bag. The normal method of manufacturing such bags is to provide two gusset folds or pleats down the length of the bag and to cut the tube into short lengths, sealing one end transversely to form the closed bottom of the bag. The only difficulty in this conversion is the means of forming the gusset folds.

Many devices have been employed to transform tubular plastic film into a series of bags with gusset folds. The most common procedure is to employ an internal mechanical spreader which is inserted inside the tubular film to open the tube so that gusset folds can be formed in the sides of the bag. Internal spreading devices have many disadvantages, not the least of which is the necessity of maintaining a large inventory of different sizes of spreaders to make many different sizes of bags from many different sizes of tubular film. Other disadvantages include limiting the size of package which can be prepared, limiting the depth and size of the gusset fold which may be employed, and losing considerable production time in changing from one internal spreader to another when a different size of bag is to be produced. The present invention provides a simple procedure for preparing bags of any size without employing these cumbersome devices of the past.

It is an object of this invention to provide a novel process and apparatus for preparing bags with gusset folds from a tubular film of plastic material. It is another object of this invention to provide a process and apparatus for preparing bags with gusset folds without the necessity of employing an internal spreading device. It is still another object of this invention to provide a process and apparatus for simultaneously preparing different sizes of bags with gusset folds from a single tube of plastic film. Still other objects will be apparent to those skilled in the art of bag making after reading the more detailed description of this invention which follows.

The foregoing objects are accomplished in accordance with this invention by continuously passing a flattened, tubular film in a longitudinal direction through an inflation zone where the film is transitorily inflated between two seals, pinching the flat film as it moves into and out of the inflation zone, and immediately prior to leaving that zone, forming a gusset fold in the inflated tubular film, and creasing that fold into the flattened film as it passes through the seal at the outlet end of the inflation zone. In one embodiment of this invention, a tubular transparent plastic film is slit lengthwise and rewelded along the corresponding edges of the slit to produce two parallel tubes of plastic material moving in a side-by-side relationship through the remaining operations producing gusset folds in the two tubes of film in the same manner as described above.

The flattened tubular film with gusset folds is converted into a series of bags by heat sealing the tube transversely and cutting the tube transversely to form a series of cut sections, the heat-sealed end forming the bottom of the bag and the cut end forming the open end of the bag.

In the attached drawings
FIGURE 1 is an overall isometric view of the process and apparatus of this invention.
FIGURES 2, 3, 4, 5, 6 and 7 are cross-sectional views of the tubular film at various stages in the process, namely at sections A—A, B—B, C—C, D—D, E—E, and F—F, respectively.

In FIGURE 1 a detailed illustration of the apparatus and process of this invention is shown. A plastic film is shown at the bottom of FIGURE 1 entering the process as a flattened tube, produced in an extruder. This film may have passed through any other desired processing steps after being formed by extrusion and before being subjected to the bag making operation of this invention. In this drawing, the tube is split into two pieces and eventually becomes two smaler tubes, each of which are used in the manufacture of bags. If the tube, as received from the extruder, is not to be split but rather is to be made into bags of the same size as that received from the extruder, the operations of this invention are somewhat more simplified than that shown in the drawing, as will be described hereinafter.

The flattened tube passes through pinch rolls 1 which may be driven rolls or may be driving rolls to move the plastic film as well as to apply transverse pressure across the nip of the two rolls. The flattened film is held in tension between pinch rolls 1 and a second set of pinch rolls 2 so that the film may be slit by a knife or other cutting device and accurately resealed into two tubes while the film is moving. The drawing illustrates both operations taking place by means of a heated knife edge 4 which cuts the film and provides sufficient heat to weld the corresponding cut edges to produce two tubes of film from the original single tube. It is not necessary, of course, that these operations be accomplished by means of a heated knife, since any means of longitudinally slitting and of subsequently welding the slit edges is acceptable.

The two tubes pass through pinch rolls 2 into a zone of transitory inflation, which zone is defined by an inlet pair of pinch rolls 2 and an outlet pair of pinch rolls 9. Between these two pairs of rolls, the two tubes are each inflated with an internal gas pressure, which normally would be air pressure, but which might be any other type of gas suitable for this purpose. The internal inflation tends to cause the tubes to open up into a substantial circular cross-section and this cross-section is changed to a more elliptical shape by means of guide rolls 3. While in this elliptical shape, as indicated generally at 5 and 7, these two inflated tubes pass through a pair of gusset fold forming devices. Inflated tube 5 passes gusset fold forming devices 6 and inflated tube 7 passes gusset fold forming devices 8. The elliptical shapes of the inflated tubes 5 and 7 make it easier to produce and to position the desired gusset folds and to start the operation of flattening the tubes as they approach the outlet pair of pinch rolls 9. The gusset folds are creased in place as the two tubular pieces of film pass through the outlet pair of pinch rolls 9 to produce a flattened tube with a gusset fold at each edge of the tube. Bags may be formed from this flattened, folded film by merely applying a transverse heat seal to form the bottom of the bag and cutting the tube transversely to form the open end of the bag.

In FIGURE 2 there is a cross-sectional view of the flattened tubular film (taken along line A—A of FIGURE 1) which is fed into the process of this invention. After this film is slit longitudinally and welded along corresponding edges of the slit the cross-section taken along line B—B has the form of two small flattened tubular films as shown in FIGURE 3. When these two tubular films pass the inlet pair of pinch rolls 2 and enter the inflation zone, a balloon shape is formed as shown in FIGURE 4, which is a cross-sectional view taken along line C—C. Guide rolls 3 flatten these balloon shapes somewhat as shown by FIGURE 5 which is a cross-sectional view taken along line D—D. After the gusset folds have been formed by the devices at 6 and 8 the tubes have assumed the shapes shown in FIGURE 6 where reentrant folds, termed "gusset folds" in this description, has been produced on opposite sides of each tubular film. FIGURE 6 shows the cross-sectional view generally taken along line E—E. When these tubular films with gusset folds in them have passed through the outlet pair of pinch rolls 9, the tubes are flattened and the folds are creased to form the shapes shown in FIGURE 7 which is a cross-sectional view taken along line F—F.

The inflated zone between rolls 2 and rolls 9 remains stationary with respect to the apparatus, i.e., the inflated zone is always between rolls 2 and rolls 9 even though the film passes through this zone from a flattened condition to an inflated condition and back to a flattened condition again. Rolls 2 and rolls 9 must, therefore, function as gas pressure seals to maintain the inflated condition of the tubes and not to permit any substantial amount of leakage of internal gas pressure past either of these two seals. This zone is inflated initially by employing a hollow needle to puncture the film after it passes rolls 2 and by inflating the tube through the hollow needle before the tube passes through rolls 9. If during the process of this invention there is leakage, the zone may be reinflated by the same technique employing the hollow needle.

The single tubular film may be slit into two or more tubes by knife edge 4 and that these resulting tubes may be of the same or different sizes. Thus, large and small bags may be made at the same time by means of this invention. When the operator wishes to make larger bags and does not wish to slit the tubular film, pinch rolls 1 can be eliminated as well as knife edge 4 so that the film from the extruder may be fed directly to the inlet pair of pinch rolls, inflated, passed through guide rolls 3 and subjected to the gusset fold forming devices, and finally passed through the outlet pair of pinch rolls 9.

All components of the apparatus of this invention are so mounted that adjustments can be made without having a shut-down in the operation. For example, rolls 2 and 9 are fitted with an adjustment whereby more or less pressure between the rolls can be applied to move the film and to maintain the gas pressure in the inflation zone. Knife edge 4 may be mounted on a hinged micrometer adjustment so that the knife may be moved completely from the film or it may be adjusted to any position across the width of the film to cut at any desired dimension. The gusset fold forming devices as shown at 6 and at 8 may be mounted on any type of mechanism which permits them to be moved away from one another or closer to one another, depending upon the size of bag and the size of gusset folds to be produced; and, furthermore, these gusset fold forming devices may be made adjustable so as to incline the trailing point more or less into the bag to produce the desired design of fold as it passes through the outlet pair of pinch rolls 9. In a similar fashion guide rolls 3 must be adjustable with respect to each other so that the inflated film can be guided and/or compressed to the optimum elliptical cross-section.

Among the types of plastic which are commonly made into bags may be mentioned the polyolefins, such as polyethylene, polypropylene, polybutene, polybutadiene, and the like, the polyvinyl resins such as polyvinyl chloride, polyvinylidene chloride, polyvinyl fluoride, polystyrene; the rubbers; cellophane; and an innumerable variety of copolymers and interpolymers derived from any of the foregoing types of materials and other polymerizable monomeric materials. This invention is not to be limited to the use of any one of these materials, since any tubular film material which can be inflated transitorily and subjected to a gusset fold forming operation is operable for the intended purpose.

The foregoing description and the attached drawing are intended to be illustrative of the spirit of this invention and not to be restrictive in any sense whatsoever. The scope of this invention is not intended to be limited to any device, mechanism, or process other than those described in the appended claims.

What is claimed is:

1. A method for continuously producing a gusset fold in moving tubular film, which comprises continuously passing in a longitudinal direction a flattened, tubular film through an inflation zone where the tube is inflated by an internal gas pressure, said zone being bounded by two seals pinching the flat film as it moves into and out of said inflation zone, and, immediately prior to leaving said zone, forming at least one gusset fold in said inflated tube and creasing that fold by means of the seal as the film leaves the inflation zone.

2. A method for continuously producing two opposed gusset folds in a moving tubular film which comprises continuously passing in a longitudinal direction a flattened, tubular film through an inflation zone where the tube is inflated by an internal gas pressure, said zone being bounded by two seals, one at the inlet end of said zone and the other at the outlet end of said zone, which transversely pinch the flat film with sufficient pressure to avoid any substantial leakage of said gas past said seals, forming two opposed gusset folds in said film immediately prior to the passage of said film through the said outlet seal, creasing said folds by means of said outlet seal, and recovering a continuous flattened tubular film with two opposed gusset folds.

3. A method for continuously producing a plurality of tubular films each with two opposed gusset folds which comprises continuously passing in a longitudinal direction a flattened, tubular film through a zone where the tube is slit longitudinally and welded along the resulting cut edges to produce two parallel, flattened tubular films, passing said tubular films into an inflation zone where each tube is inflated with internal gas pressure maintained within that zone by an inlet seal and an outlet seal, said seals pinching the moving film transversely and preventing any substantial leakage of said gas from the inflation zone, forming two opposed gusset folds in each of said tubular films immediately prior to the passage of said film through said outlet seal, creasing said folds in said outlet seal, and recovering two continuous flattened tubular films, each having two opposed gusset folds.

References Cited

UNITED STATES PATENTS 3,023,674 3/1962 Piazze _____ 93—35
3,156,010 11/1964 Osborn _____ 93—20

GERALD A. DOST, *Primary Examiner.*